(No Model.) 2 Sheets—Sheet 1.

T. M. HEARD.
EYEGLASSES.

No. 598,928. Patented Feb. 15, 1898.

Witnesses.
J. F. Griswold
A. J. Wright

Inventor.
Thomas M. Heard.
By J. A. Osborne & Co.
his Attys.

THE NORRIS PETERS CO., PHOTO-LITHO., WASHINGTON, D. C.

(No Model.) 2 Sheets—Sheet 2.

T. M. HEARD.
EYEGLASSES.

No. 598,928. Patented Feb. 15, 1898.

WITNESSES

INVENTOR
T. M. Heard,
By Frederick Benjamin
his Attorney

UNITED STATES PATENT OFFICE.

THOMAS M. HEARD, OF CLEVELAND, OHIO.

EYEGLASSES.

SPECIFICATION forming part of Letters Patent No. 598,928, dated February 15, 1898.

Application filed July 21, 1897. Serial No. 645,481. (No model.)

*To all whom it may concern:*

Be it known that I, THOMAS M. HEARD, a citizen of the United States, residing at Cleveland, in the county of Cuyahoga, State of Ohio, have invented certain new and useful Improvements in Eyeglasses, of which the following, with the accompanying drawings, is a full, clear, and exact description.

My invention relates in general to eyeglasses, and particularly to the construction and arrangement of the bow-spring and nose-guards and the manner of connecting them with the lenses or frame.

In my improved eyeglasses the spring and nose-guards are made of a single piece. The spring is attached to the lenses or frames, as the case may be, from the front and at right angles to the plane of the lenses. No coupling-posts are used. The offsets of the nose-guards are in line with the centers of the lenses. No discomfort is experienced by the wearer from the pressure on the nose, and the use of cork, rubber, celluloid, or other covering for the nose-guards is done away with.

The objects of the invention are, first, to provide an improved, a simple, and an effectual support for eyeglasses; second, to do away with the pinching of the nose by the nose-guards; third, to provide for accurately and permanently fixing the optical centers of the lens; fourth, to provide a support for the lenses of eyeglasses so constructed that when it shall be once properly adjusted to the eyes and nose of the wearer it will not easily become disarranged.

Other minor objects of the invention will appear from the following description.

The invention consists in the construction and combination of the parts hereinafter described, and pointed out definitely in the claims.

Figure 1:
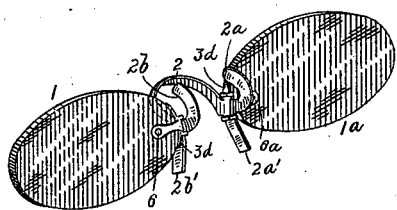
Figure 2:
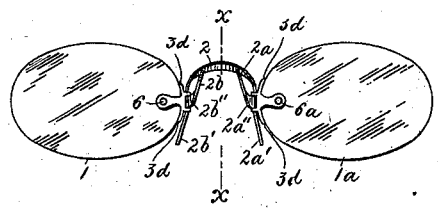
Figure 3:
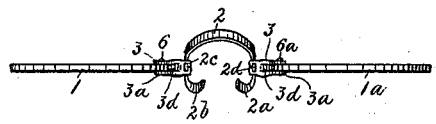
Figure 4:
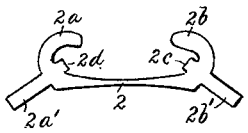
Figures 5, 6:
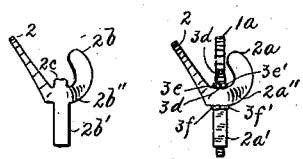
Figure 7:
Figure 8:
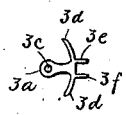
Figure 9:
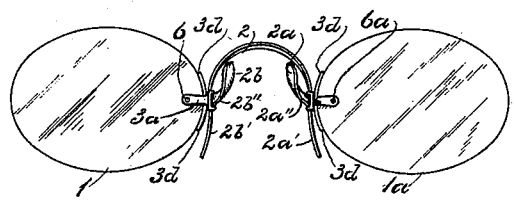
Figure 10:
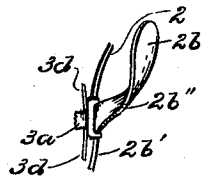

In the drawings, Figure 1 is a perspective view of a pair of eyeglasses embodying my invention. Fig. 2 is a rear elevation thereof, and Fig. 3 is a plan view. Fig. 4 is an illustration of the blank spring and nose-guards. Fig. 5 is a side elevation of the spring and nose-guards detached. Fig. 6 is a vertical section on line $x$ $x$ of Fig. 2. Fig. 7 is a blank of one of the combined straps and clips, and Fig. 8 is a side view of the said strap and clip struck up into shape for use. Fig. 9 is a rear perspective view, and Fig. 10 is an enlarged detail showing the upper branch of one of the nose-guards.

Throughout the specification and drawings like parts are designated by like characters.

The eyeglasses illustrated in the drawings forming part of this specification are without frames; but it will readily be understood from the description that the invention will apply as well to eyeglasses with frames.

In my improved glasses but seven separate pieces are used. The lenses 1 and $1^a$ form two of the pieces. The third piece is made up of the bow-spring 2, the right nose-guard consisting of the upper branch $2^a$ and the lower branch $2^{a\prime}$, the left nose-guard consisting of the upper branch $2^b$ and the lower branch $2^{b\prime}$, and the two vertical projections $2^c$ and $2^d$. The fourth and fifth pieces connect the lenses with the spring and nose-guards, and the screws 6 and $6^a$ form the sixth and seventh pieces.

The bow-spring and nose-guards are stamped out of sheet metal in the form shown in Fig. 4. The blank is then bent to form the arch or bow-spring 2 and the two nose-guards. The upper branches $2^a$ and $2^b$ of the nose-guards are offset at the points $2^{a\prime\prime}$ and $2^{b\prime\prime}$. When the parts are all assembled, these points $2^{a\prime\prime}$ and $2^{b\prime\prime}$ are in line with the centers of the lenses. The upper branches $2^a$ and $2^b$ of the nose-guards project backwardly on a line with the centers of the lenses, then curve upwardly and forwardly, and incline toward the bow-spring, and the lower branches $2^{a\prime}$ and $2^{b\prime}$ extend downwardly in a vertical plane with the lenses.

The connections between the nose-guards and lenses are made as follows: Two pieces are cut out of sheet metal in the form shown in Fig. 7. These pieces form the combined ears, strap, and clip for attaching the lenses to the nose-guard. After the blanks are stamped in the shape shown in Fig. 7 they are bent into the form shown in Fig. 8. The two extensions 3 and $3^a$ form ears which extend on each side of the lens, and are provided with holes $3^b$ and $3^c$, which register with a hole in the lens to receive a rivet or screw 6 or $6^a$. The points $3^d$ $3^d$ form the strap and are bent to conform to the curvature of the edge of the lens. The prongs $3^e$ and $3^{e\prime}$ are adapted to be bent over to clamp one of the projections 2ᶜ or 2ᵈ, and the prongs 3ᶠ and 3ᶠ' are adapted to be bent over to clamp one of the lower branches 2ᵃ' or 2ᵇ' of the nose-guards. Said clips thus firmly connect the nose-guards and bow-spring with the lenses without the use of coupling-posts and post-screws. The only screws or rivets used in the construction are those which connect the lenses with the ears of the clips. After the parts are assembled as described the upper and lower branches of the nose-guards and the bow-spring may be adjusted to the nose of the wearer. The lower branches 2ᵃ' and 2ᵇ', which are in contact with the bony portion of the nose, do not pinch, their only purpose being to steady the eyeglasses in their proper place. The eyeglasses are held firmly on the nose without annoyance to the wearer by the upper branches 2ᵃ and 2ᵇ of the nose-guards. Owing to the peculiar shape and the positions of the upper branches of the nose-guards and their coöperation with the bow-spring, the feeling to the wearer is that of security and adhesion rather than pinching.

It will be observed that the bow-spring sits at approximately an angle of forty-five degrees with the plane of the lenses, while the upper branches of the nose-guards extend at a similar angle on the opposite side of the lenses. The effect of this construction is to obtain a broad bearing-surface for the glasses on the nose, it being understood that the bow-spring rests on the nose. The forwardly-curving ends of the upper branches of the nose-guards also give a wide bearing and tend to overcome the tendency to slip downwardly.

By "peculiar shape" mentioned above I refer to the torsional twist in said upper branches, as clearly shown in Figs. 9 and 10, the effect of which is twofold. It makes the upper portion of these branches conform to the shape of the portion of the nose upon which they directly bear and also exerts a pressure, which adds to the effectiveness of the device. It will also be observed that the upper and lower branches form the two ends of a spring, the normal tendency of which is pressure against the nose, though the lower branches are so arranged that the pressure is very slight.

What I claim as my invention, and desire to secure by Letters Patent, is—

1. In eyeglasses, the combination of a bow-spring, nose-guards having lower and upper branches, the latter being offset on a line with the center of the lenses and curving backwardly and upwardly and having a torsional twist, and the lower arms being in approximately the same vertical plane as the lenses, substantially as described.

2. In eyeglasses, the combination of a bow-spring and nose-guards, the bow-spring entering from the front of the lenses and set at an angle thereto, and the upper arms of the nose-guards curving backwardly and upwardly and set at an angle opposite to the angle of the bow-spring, substantially as set forth.

3. In eyeglasses, the combination of a bow-spring and nose-guards, said guards being provided with downwardly-extending arms, and arms curving backwardly, upwardly and forwardly, and means for attaching said bow-spring and nose-guards to lenses, substantially as set forth.

4. In eyeglasses, the combination of a bow-spring and nose-guards, the latter having upwardly-extending arms formed with a torsional twist therein, and downwardly-extending arms and clips for attaching said bow-spring and nose-guards to lenses, substantially as described.

5. In eyeglasses, the combination of a bow-spring and nose-guards, said bow-spring set at an angle to the plane of the lenses, and said nose-guards having upwardly-extending arms curving backwardly, upwardly and forwardly and having a torsional twist, and downwardly-extending arms, and clips adapted to embrace the nose-guards, bow-spring and the lenses, substantially as described.

6. In eyeglasses, the combination with bow-spring, nose-guards and lenses of clips, formed from a single piece of metal, having six horizontal arms and two vertical arms and adapted to embrace the bow-spring, nose-guards and lenses, substantially as set forth.

7. In eyeglasses, the combination, with lenses, of a bow-spring set at an angle to the plane of the lenses, nose-guards formed integrally with the bow-spring and set at an opposite angle to the bow-spring, said nose-guards having upwardly-extending arms curved backwardly, upwardly and forwardly and having a torsional twist, and clips adapted to embrace the nose-guards, bow-spring and lenses, substantially as described.

In testimony whereof I affix my signature, in the presence of two witnesses, this 13th day of July, 1897.

THOMAS M. HEARD.

Witnesses:
J. A. OSBORNE,
L. F. GRISWOLD.